United States Patent
Tsirkin et al.

(10) Patent No.: US 10,331,589 B2
(45) Date of Patent: Jun. 25, 2019

(54) STORING INTERRUPT LOCATION FOR FAST INTERRUPT REGISTER ACCESS IN HYPERVISORS

(71) Applicant: Red Hat Israel, Ltd, Raanana (IL)

(72) Inventors: Michael Tsirkin, Yokneam Yillit (IL); Ronen Hod, Shoham (IL)

(73) Assignee: Red Hat Israel, Ltd., Raanana (IL)

( * ) Notice: Subject to any disclaimer, the term of this patent is extended or adjusted under 35 U.S.C. 154(b) by 133 days.

(21) Appl. No.: 13/766,264

(22) Filed: Feb. 13, 2013

(65) Prior Publication Data

US 2014/0229648 A1    Aug. 14, 2014

(51) Int. Cl.
*G06F 13/24* (2006.01)

(52) U.S. Cl.
CPC .................... *G06F 13/24* (2013.01)

(58) Field of Classification Search
CPC ............. G06F 13/24; G06F 9/45558; G06F 2009/45583
USPC ........................... 710/260, 267, 269
See application file for complete search history.

(56) References Cited

U.S. PATENT DOCUMENTS

| | | | |
|---|---|---|---|
| 6,378,023 B1 * | 4/2002 | Christie | G06F 12/0875 710/260 |
| 7,209,994 B1 * | 4/2007 | Klaiber | G06F 9/45533 710/260 |
| 2002/0042856 A1 | 4/2002 | Hartwell et al. | |
| 2003/0046464 A1 * | 3/2003 | Murty et al. | 710/260 |
| 2005/0080965 A1 * | 4/2005 | Bennett | G06F 9/45533 710/200 |
| 2005/0154813 A1 * | 7/2005 | DeWitt et al. | 710/260 |
| 2006/0136653 A1 | 6/2006 | Traut et al. | |
| 2007/0157197 A1 * | 7/2007 | Neiger | G06F 9/45533 718/1 |
| 2008/0040721 A1 | 2/2008 | Wang et al. | |
| 2008/0046700 A1 | 2/2008 | Gara et al. | |
| 2009/0328035 A1 * | 12/2009 | Ganguly | 718/1 |
| 2010/0023666 A1 * | 1/2010 | Mansell et al. | 710/267 |
| 2010/0138208 A1 * | 6/2010 | Hattori | G06F 9/45558 703/25 |
| 2010/0191887 A1 * | 7/2010 | Serebrin | G06F 9/4812 710/267 |
| 2011/0072426 A1 * | 3/2011 | Huang | G06F 9/544 718/1 |

(Continued)

OTHER PUBLICATIONS

Nakajima, Jun, Intel Corporation, "Reviewing Unused and New Features for Interrupt/APIC Virtualization", 10 pages, May 2012.

(Continued)

*Primary Examiner* — Tim T Vo
*Assistant Examiner* — Phong H Dang
(74) *Attorney, Agent, or Firm* — Lowenstein Sandler LLP (57) ABSTRACT

Methods, systems, and computer program products for using a stored interrupt location to provide fast interrupt register access in hypervisors are presented. A computer-implemented method may include maintaining an area of memory in a hypervisor to track a location of an interrupt vector corresponding to an asserted interrupt in a virtual machine, storing the location of the interrupt vector in the area of memory when responding to the asserted interrupt, and examining the area of memory to determine when an interrupt is present in the virtual machine.

17 Claims, 6 Drawing Sheets

(56) References Cited

U.S. PATENT DOCUMENTS

| | | | |
|---|---|---|---|
| 2011/0145461 A1* | 6/2011 | Zhao | G06F 9/4812 710/267 |
| 2011/0161541 A1* | 6/2011 | Madukkarumukumana | G06F 13/24 710/260 |
| 2011/0197003 A1* | 8/2011 | Serebrin | G06F 9/45558 710/267 |
| 2013/0047157 A1* | 2/2013 | Suzuki | 718/1 |
| 2013/0054861 A1* | 2/2013 | Tsirkin | G06F 13/24 710/266 |
| 2013/0159579 A1* | 6/2013 | Neiger | G06F 9/30076 710/265 |
| 2013/0219389 A1* | 8/2013 | Serebrin et al. | 718/1 |
| 2014/0082240 A1* | 3/2014 | Coleman | G06F 9/4812 710/260 |
| 2014/0223060 A1* | 8/2014 | Tsirkin et al. | 710/261 |
| 2014/0229648 A1 | 8/2014 | Tsirkin et al. | |

OTHER PUBLICATIONS

USPTO Non-final Office Action dated Jan. 8, 2015; U.S. Appl. No. 13/766,255.
USPTO Final Office Action dated Jun. 23, 2015; U.S. Appl. No. 13/766,255.
USPTO Notice of Allowance dated Nov. 12, 2015; U.S. Appl. No. 13/766,255.
USPTO Notice of Allowance dated Nov. 23, 2015; U.S. Appl. No. 13/766,255.
USPTO Advisory Action dated Sep. 3, 2015; U.S. Appl. No. 13/766,255.

\* cited by examiner

STORING INTERRUPT LOCATION FOR FAST INTERRUPT REGISTER ACCESS IN HYPERVISORS

TECHNICAL FIELD

Examples of the present disclosure generally relate to virtual machines, and more specifically, relate to interrupt handling in virtual machines.

BACKGROUND

An interrupt is a signal sent to a central processing unit (CPU) to inform the CPU of an event requiring immediate attention. An interrupt controller is a device responsible for delivering an interrupt to a CPU. An interrupt controller also may send interrupt handler information to a CPU. Interrupt handler information may include a memory address where an interrupt service routine is stored.

A CPU halts instruction processing and stores the existing execution state when an interrupt occurs. The CPU may then begin executing instructions of an interrupt service routine located at a specific memory address. On completion, the CPU may restore the previously saved execution state and resume instruction processing at the point where the interrupt occurred.

A virtual machine is a software-based emulation of a physical computing environment that includes its own virtual resources (e.g., CPU, RAM, disk storage, network connectivity, etc.). Virtual machines can simulate interrupts and interrupt processing to mimic operations that occur on a physical computing system.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Disclosed herein are systems, methods, and computer program products for using a stored interrupt location to provide fast interrupt register access in hypervisors.

In an example, a virtual machine may simulate interrupt processing and interrupt controller functionality of a physical computer system. For example, the virtual machine may provide software emulation of registers associated with a physical interrupt controller of a specific computing platform (e.g., an advanced programmable interrupt controller (APIC) of the x86 architecture). The virtual machine also may provide a set of interrupt vectors that each correspond to an architecturally-defined platform exception (e.g., a fault, a trap, an abort, etc.). Further, the registers provided by the virtual machine may include a set of bits that each represent an interrupt vector of the platform.

For example, an Interrupt Request Register (IRR) and/or an In-Service Register (ISR) on the APIC platform each may include a stream of 256 bits. Further, each of the bits may represent an assertable interrupt vector provided by the APIC platform. In one example, an asserted interrupt may be handled by first setting a corresponding IRR interrupt vector bit. The set IRR interrupt vector bit then may be cleared and a corresponding ISR interrupt vector bit may be set when the asserted interrupt is processed by the virtual machine.

A hypervisor may seek to determine whether an interrupt has been asserted in a virtual machine. For example, a hypervisor may use information about asserted interrupts (e.g., presence, location, etc.) when determining how to carry out interrupt processing. A hypervisor typically scans a set of registers to determine information about asserted interrupts. However, the inefficiency of register scanning can be avoided when the hypervisor is already aware of such information.

In one example, a hypervisor may maintain an area of local memory (i.e., within the hypervisor) to store information about the location (e.g., register, position, type, id, etc.) of a set interrupt vector corresponding to an asserted interrupt in a virtual machine. The hypervisor also may examine the local memory during interrupt processing, as needed, to determine current information about a set interrupt vector. Thus, the hypervisor may reference the area of local memory to determine information about a set interrupt vector as an efficient alternative to scanning a set of registers in a virtual machine.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

Figure 1:
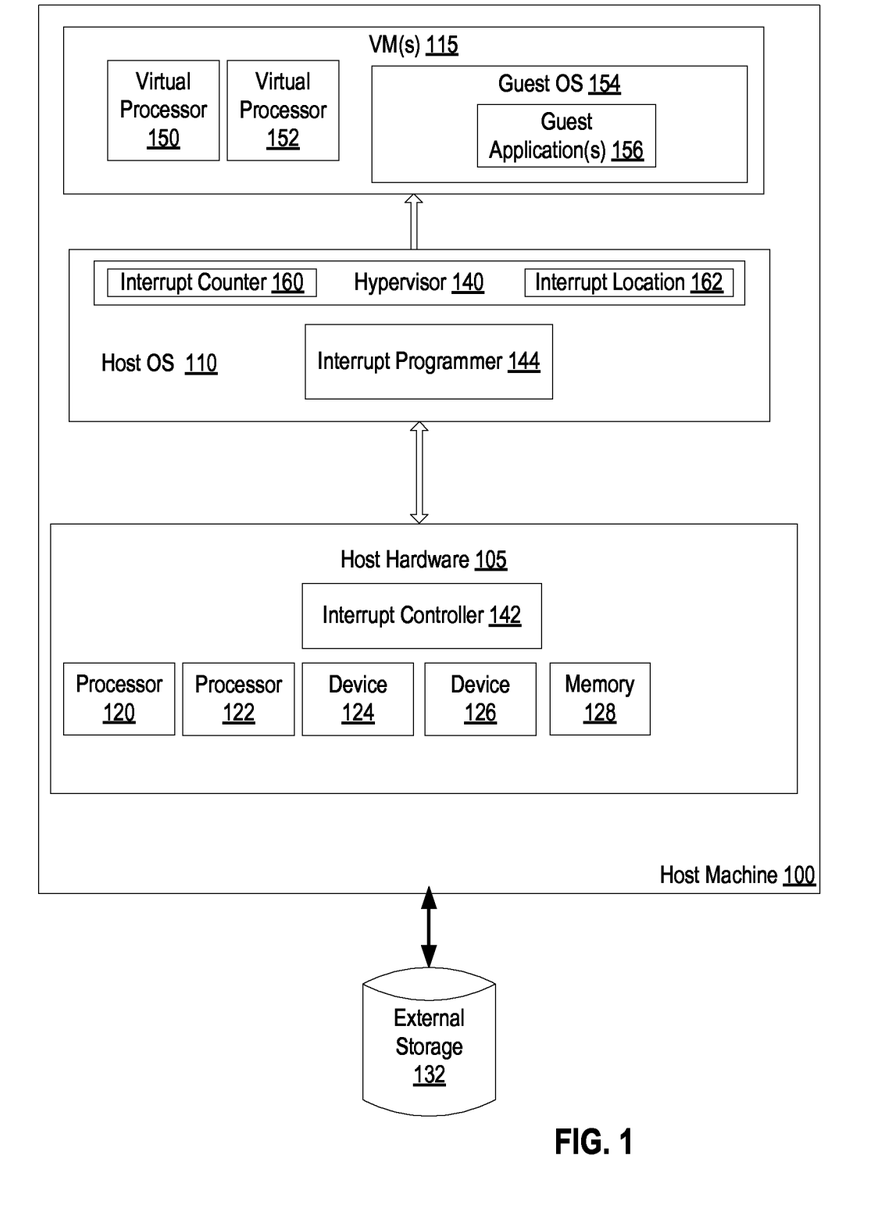
FIG. 1 is a block diagram illustrating an example of a computer system that hosts one or more virtual machines.

FIG. 1 is a block diagram that illustrates an example of a computer system (referred to herein as a host machine 100) that hosts one or more virtual machines (VMs) 115. The host machine 100 may be a rackmount server, a workstation, a desktop computer, a notebook computer, a tablet computer, a mobile phone, a palm-sized computing device, a personal digital assistant (PDA), etc.

The host machine 100 includes host hardware 105, which includes multiple processors 120, 122, multiple devices 124, 126, memory 128, and other hardware components. The memory 128 may include volatile memory devices (e.g., random access memory (RAM)), non-volatile memory devices (e.g., flash memory), and/or other types of memory devices. The host hardware 105 also may be coupled to external storage 132 via a direct connection or a local network. The host machine 100 may be a single machine or multiple host machines arranged in a cluster.

The term "processor," as used herein, refers to a single processor core. Each processor 120, 122 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores.

In one example, processors 120, 122 are processor cores of the same integrated circuit and share a socket. Processors that share a socket may communicate with one another more efficiently than processors that do not share a socket.

Each of the devices 124, 126 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc. Devices 124, 126 communicate with the host machine (e.g., notify the host machine 100 of events) by generating device interrupts.

In one example, devices 124, 126 send device interrupts to an interrupt controller 142 (e.g., an advanced programmable interrupt controller (APIC)) on the host machine 100 via a physical interrupt line. The interrupt controller 142 is a device that is a component of the host hardware 105. The interrupt controller 142 receives interrupts and determines which processors 120, 122 should handle the interrupts. The interrupt controller 142 then sends the device interrupts to the determined processors. For example, interrupt controller 142 may receive an interrupt from device 124 and send the interrupt to processor 120.

In another example, devices 124, 126 generate message signaled interrupts (MSIs). A message signaled interrupt does not use a physical interrupt line. Instead, the device 124, 126 sends the device interrupt in-band over some communications medium, such as a computer bus. Message signaled interrupts designate a processor to handle the interrupt. Some devices 124, 126 may send MSIs, while other devices 124, 126 may generate standard or legacy device interrupts. Further, a single device may support generating both MSIs and standard device interrupts, though not generally at the same time.

The host machine 100 includes a hypervisor 140 (also known as a virtual machine monitor (VMM)). In one example (as shown), the hypervisor 140 is a component of a host operating system 110. Alternatively, the hypervisor 140 may run on top of a host OS 110, or may run directly on host hardware 105 without the use of a host OS 110.

The hypervisor 140 manages system resources, including access to memory 128, devices 124, 126, secondary storage, and so on. The hypervisor 140, though typically implemented in software, may emulate and export a bare machine interface (host hardware 105) to higher-level software. Such higher-level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115, which may provide the same or different abstractions to various guest software (e.g., guest operating system, guest applications, etc.).

The hypervisor 140 includes and/or uses an interrupt counter 160 to track when interrupt vectors are set in a virtual machine (VM) 115. In an example, an interrupt counter 160 is provided directly in the memory of the hypervisor 140 (e.g., in physical memory that is assigned to and utilized by the hypervisor 140). In another example, the hypervisor 160 references a hardware implementation of an interrupt counter (e.g., using a CPU instruction) without implementing a software-based interrupt counter 160. The hypervisor 140 may use an interrupt counter 160 to quickly determine when interrupt vectors are set, instead of scanning a series of registers in the VM 115.

Interrupt counter 160 may track whether interrupt vectors are set for a single register or a plurality of registers in a virtual machine (VM) 115. Further, interrupt counter 160 may be used by the hypervisor 140 during interrupt handling and/or other processing to determine when interrupt vectors are set for one or more registers of a virtual machine.

The hypervisor 140 may examine the interrupt counter 160 before or instead of performing a full scan of a plurality of registers (e.g., an entire set of registers) to determine when an interrupt vector is set in a virtual machine (VM) 115. Such information may help the hypervisor 140 to first determine whether scanning a set of interrupt registers is to be performed or can be avoided.

In some examples, use of an interrupt counter 160 helps the hypervisor 140 to avoid scanning a set of registers. For example, scanning a set of interrupt registers may be avoided when a new interrupt has been asserted and the interrupt counter 160 indicates that no corresponding interrupt vector has been set in a virtual machine (VM) 115.

In one example, the interrupt counter 160 may provide the hypervisor 140 with a total count of interrupt vectors that are set in a virtual machine (VM) 115. For example, a virtual machine (VM) 115 emulating an x86 central processing unit (CPU) architecture may provide a total of 256 interrupt vectors. Thus, an interrupt counter 160 used to track a set interrupt vectors in this example could range anywhere from a value of 0 (no interrupt vector is set) to 256 (each interrupt vector is set).

In an example, an interrupt counter 160 may be implemented as a single numeric counter (e.g., bit, integer, etc.) to indicate a total count of set interrupt vectors in a specific virtual machine (VM) 115. In another example, an interrupt counter 160 may be implemented as a plurality of numeric counters (e.g., bits, integers, etc.) where each counter is associated with a specific register in a specific virtual machine (VM) 115. For example, an interrupt counter 160 may be implemented using a vector, a list, an array, an object, and/or any other data type, data structure or combination thereof to indicate set interrupt vectors for a specific register of a specific virtual machine (VM) 115.

In an example, the hypervisor 140 provides and maintains different interrupt counters 160 that are each specific to different virtual machines (VM) 115. For example, the hypervisor 140 may provide and maintain an interrupt counter 160 (or a set of interrupt counters 160) specific to a first virtual machine. The hypervisor 140 also may provide and maintain a different interrupt counter 160 (or a different set of interrupt counters 160) specific to a second virtual machine. Thus, the hypervisor 140 may include a plurality of interrupt counters 160 from one or more virtual machines (VMs) 115.

In one example, the hypervisor 140 may initialize the interrupt counter 160 for a virtual machine (VM) 115. During the initialization, the hypervisor 140 may, for example, set the interrupt counter 160 to a value such as zero ("0"), "empty", NULL, etc. The hypervisor 140 also may clear or reset interrupt vectors that are set in the virtual machine (VM) 115 as part of the initialization process. Further, the hypervisor 140 may initialize the interrupt counter 160 at any time during processing.

The hypervisor 140 includes an interrupt location 162. The hypervisor 140 may use the interrupt location 162 to store information (e.g., register, position, type, id, etc.) about a set interrupt vector corresponding to an asserted interrupt. In an example, the interrupt location 162 may be a reserved area of memory (e.g., shadow register) in the physical memory assigned to the hypervisor 140.

In one example, the hypervisor 140 may emulate a physical interrupt controller of a computing platform (e.g., an advanced programmable interrupt controller (APIC) of the x86 architecture). As part of the emulation, the hypervisor 140 may provide a stream of interrupt vector bits in a register that correspond to interrupts on the platform. The hypervisor 140 may set an interrupt vector bit corresponding to an asserted interrupt when responding to an asserted interrupt in a virtual machine (VM) 115. Further, the hypervisor 140 may clear the interrupt vector bit when the asserted interrupt is no longer pending.

In an example, the hypervisor 140 may use the interrupt location 162 to store information about an interrupt vector that corresponds to an asserted interrupt in a virtual machine (VM) 115. For example, an interrupt location 162 may provide information (e.g., register, position, type, id, etc.) about an interrupt vector bit that is set in a register of a virtual machine (VM) 115. The interrupt location 162 may, for example, reference or contain a position of a set interrupt vector bit among a series of interrupt vector bits in a register. For example, in a set of 256 bits corresponding to a set of 256 registers, each bit has its own relative position (e.g., 0-255 when the first bit is considered position 0 and from 1-256 when the first bit is considered position 1).

In an example, the hypervisor 140 may receive and inject an asserted interrupt into a virtual machine (VM) 115. For example, the hypervisor 140 may set an interrupt vector in a register of a virtual machine (VM) 115 when processing the asserted interrupt. The hypervisor 140 also may store information (e.g., register, position, type, reference id, etc.) about the set interrupt vector in the interrupt location 162 for quick reference at a later time.

In an example, the hypervisor 140 may use the interrupt location 162 to store and reference a location of a set interrupt vector corresponding to an asserted interrupt in a virtual machine (VM) 115. For example, the hypervisor 140 may use the interrupt location 162 to store information about a set interrupt vector in a virtual machine (VM) 115. The information may include, but is not limited to, an interrupt register, an interrupt vector bit position, an interrupt type, etc. Further, an offset also may be used to identify an interrupt vector (bit) among a series of interrupt vectors (bits) in a register of a virtual machine.

In an example, the hypervisor 140 may examine the interrupt location 162 at any time to obtain information about location (e.g., register, position, type, id, etc.) of a set interrupt vector corresponding to an asserted interrupt in a virtual machine. For example, the hypervisor 140 may use the interrupt location 162 to determine identity of an asserted interrupt in a virtual machine (VM) 115.

In an example, the hypervisor 140 also may examine interrupt location 162 to determine when any number of interrupt vectors have been set in a virtual machine (VM) 115. For example, the hypervisor 140 may determine that no interrupt vector is set when interrupt location 162, for example, is empty or is unset. In one example, interrupt location 162 may be unset, clear, empty, NULL, or set to a special value to indicate that no interrupt vector is set (which may also indicate that interrupt location 162 is ready to be populated).

In another example, the hypervisor 140 may determine that one interrupt vector is set when the interrupt location 162 contains information about a single interrupt vector. The hypervisor 140 also may, for example, determine that multiple interrupt vectors are set when a special value is stored in the register address 162. In one example, the hypervisor 140 may update the interrupt location 162 to the special value after attempting to store a new value in an interrupt location 162 when the interrupt location 162 has already been set. The hypervisor 140 may use the special value to indicate that multiple interrupt vectors are set in a virtual machine (VM) 115.

In one example, the hypervisor 140 initializes the interrupt location 162. For example, the hypervisor 140 may initialize the interrupt location 162 when the hypervisor initializes the interrupt counter 160. Further, the hypervisor 140 may clear all set interrupt vectors in a virtual machine (VM) 115 as part of the initialization. To initialize (i.e., set, reset, clear, etc.) the interrupt location 162, the hypervisor 140 may update the interrupt location 162 to indicate a "special", "invalid", or "reserved" value not associated with any valid interrupt vector in the virtual machine (VM) 115.

For example, the hypervisor may set/initialize the interrupt location 162 to a value that is greater than or less than a total number of possible interrupt vectors. In some examples, an "invalid" value may include a value such as zero ("0"), any negative value, or any value that exceeds a total number of possible interrupt vectors (e.g., an extremely large value). Other special values, such as "empty", NULL, and custom status identifiers or codes also may be used to indicate an interrupt location 162 that is, for example, clear, unset and/or ready for use.

In one example, the hypervisor 140 may use the interrupt counter 160 together with the interrupt location 162 for increased efficiency. For example, the hypervisor 140 may first examine the interrupt counter 160 to determine whether any interrupt vector is set in a virtual machine (VM) 115. Based on the result provided by the interrupt counter 160, the hypervisor 140 then may determine whether examining the interrupt location 162 is appropriate.

For example, when an interrupt counter 160 equals zero, the hypervisor 140 may determine that no interrupt vector is set in the virtual machine (VM) 115 and that it is unnecessary to check the interrupt location 162. When the interrupt counter 160 equals one, the hypervisor 140 may determine that a single vector is set and that it may find corresponding interrupt vector information in the interrupt location 162. Further, when the interrupt counter 160 is greater than one, the hypervisor 140 may determine that two or more interrupt vectors are set and that additional processing may be performed to determine the identity of each pending interrupt.

The hypervisor 140 may maintain multiple interrupt locations 162. For example, the hypervisor 140 may maintain one or more interrupt locations 162 for a single virtual machine (VM) 115. In one example, the hypervisor 140 maintains an interrupt location 162 for one or more registers of a virtual machine (VM) 115. The hypervisor 140 also may maintain other interrupt locations 162 that are associated with one or more different registers of the same virtual machine (VM) 115. In addition, the hypervisor 140 may include interrupt locations 162 from one or more virtual machines (VM) 115.

The host machine 100 hosts any number of virtual machines (VM) 115 (e.g., a single VM, one hundred VMs, etc.). A virtual machine 115 is a combination of guest software that uses an underlying emulation of the host machine 100 (e.g., as provided by the hypervisor 140). The guest software may include a guest operating system 154, guest applications 156, guest device drivers (not shown), etc. Virtual machines 115 can be, for example, hardware emulation, full virtualization, para-virtualization, and operating system-level virtualization virtual machines. The virtual machines 115 may have the same or different guest operating systems 154, such as Microsoft® Windows®, Linux®, Solaris®, etc.

Each VM 115 may include multiple virtual processors 150, 152. Each virtual processor 150, 152 of a VM 115 executes on a specific processor 120, 122 of the host machine 100. The hypervisor 140 may control which virtual processors 150, 152 run on which hardware processors 120, 122. For example, virtual processor 150 may run on processor 120, and virtual processor 152 may run on processor 122.

The host OS 110 may assign specific processors 120, 122 to handle interrupts for specific devices 124, 126. Additionally, the guest OS 154 of the VM 115 may assign specific virtual processors 150, 152 to handle interrupts for specific devices 124, 126. Moreover, the hypervisor 140 assigns each virtual processor 150, 152 to run on a specific hardware processor 120, 122.

In one example, the host machine assigns processor 120 to handle device interrupts for device 124, the hypervisor 140 assigns virtual processor 152 to run on processor 122, and the guest assigns virtual processor 152 to handle device interrupts for the device 124. Therefore, the virtual processor that the guest has assigned to handle device interrupts for a specific device may run on a different physical processor than was assigned to handle device interrupts for the device.

In this scenario, processor 120 would receive an interrupt for device 124. Processor 120 would then determine that virtual processor 152 is assigned to control the device and that virtual processor 152 runs on processor 122. Processor 120 would generate an inter-processor interrupt (IPI) to forward the device interrupt for device 124 to processor 122 so that virtual processor 152 running on processor 122 can act on the device interrupt.

In one example, interrupt programmer 144 programs a device 124, 126 and/or the interrupt controller 142 to cause the device 124, 126 and/or interrupt controller 142 to send device interrupts to a specified processor 120, 122. The specified processor 120, 122 may be the processor on which a virtual processor 150, 152 that handles device interrupts for that particular device 124, 126 executes. Since the overhead of communication regarding a device interrupt for a device is often greater than the overhead of actually processing the device interrupt, collocating the processing of the interrupt to a processor 120, 122 that hosts a virtual processor 150, 152 that controls the device 124, 126 can result in significant efficiency gains.

The interrupt programmer 144 may program the device 124, 126 and/or interrupt controller 142 in response to one or more update criteria. In one example, the interrupt programmer 144 keeps track of a number of IPIs that have been generated based on device interrupts for each device 124, 126. When a threshold number of IPIs have been generated based on device interrupts for a particular device 124, 126, that device and/or the interrupt controller 142 may be updated to send future device interrupts to a different processor.

In another example, the interrupt programmer 144 maintains a list (or other data structure) of devices that are controlled by each virtual processor 150, 152. When the hypervisor 140 moves a virtual processor 150, 152 to a new hardware processor 120, 122, then the interrupt programmer 144 may update the devices that are controlled by that virtual processor so that the devices will send MSIs to the new hardware processor 120, 122. Additionally, or in the alternative, the interrupt programmer 144 may update the interrupt controller 142 to send interrupts for those devices 124, 126 to the new hardware processor 120, 122.

Figure 2:
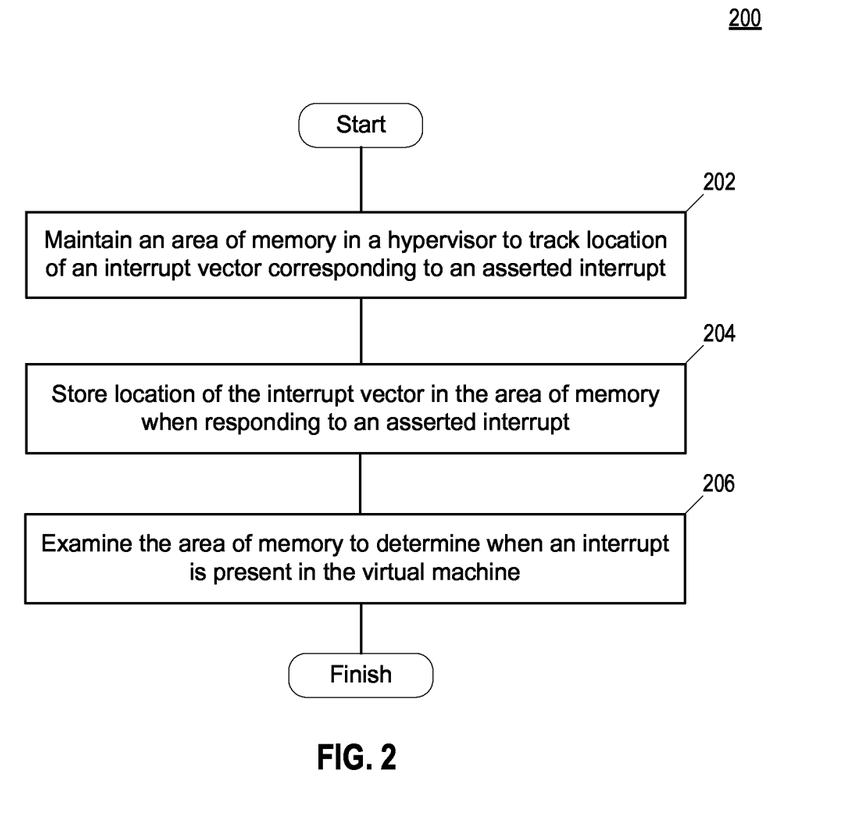
FIG. 2 is a flow diagram illustrating an example of a method for using a stored interrupt location to provide fast interrupt register access in a hypervisor.

FIG. 2 is a flow diagram illustrating an example of a method for providing using a stored interrupt location to provide fast interrupt register access in a hypervisor. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 200 is performed by the hypervisor 140 of FIG. 1.

At block 202, an area of memory is maintained in the hypervisor to track a location of an interrupt in a virtual machine. In an example, the hypervisor 140 maintains interrupt location 162 to store location of a set interrupt vector corresponding to an asserted interrupt in a virtual machine. In one example, the interrupt location 162 is maintained in an area of memory allocated to the hypervisor 140. Further, the interrupt location 162 may be stored in an area of memory that is only accessible to the hypervisor 140.

In one example, the hypervisor 140 may use the interrupt location 162 to store information identifying an interrupt vector that is set where the set interrupt vector corresponds to an asserted interrupt in a virtual machine (VM) 115. For example, this information may include, but is not limited to the type, location, register position, logical address and/or physical address of an interrupt vector that has been set.

At block 204, an interrupt vector location is stored in the memory of the hypervisor. In an example, the hypervisor 140 stores location of an interrupt vector corresponding to an asserted interrupt in the interrupt location 162. The interrupt vector location may be stored in interrupt location 162 either before or after an an interrupt vector has been set.

In one example, the hypervisor 140 receives an asserted interrupt in a virtual machine (VM) 115. The hypervisor 140 then may inject the asserted interrupt into the virtual machine (VM) 115. The hypervisor 140 may, either before or after injecting the asserted interrupt into the virtual machine, store the location of the interrupt vector corresponding to the asserted interrupt in interrupt location 162. Further, the hypervisor 140 may later examine information stored in the interrupt location 162 to determine when an interrupt vector is set in a virtual machine. The hypervisor 140 also may determine the identity of an asserted interrupt based on an interrupt vector location stored in interrupt location 162.

Figure 3:
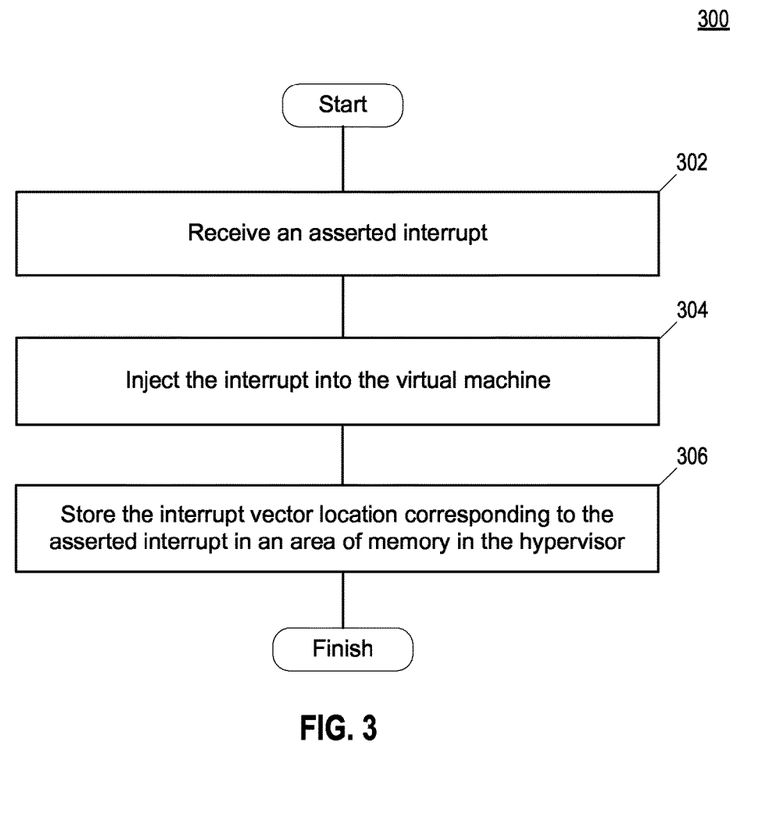
FIG. 3 is a flow diagram illustrating an example of a method for using a stored interrupt location to provide fast interrupt register access in a hypervisor in response to receiving an asserted interrupt.

FIG. 3 is a flow diagram illustrating an example of a method for using a stored interrupt location to provide fast interrupt register access in a hypervisor in response to receiving an asserted interrupt. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by the hypervisor 140 of FIG. 1.

Method 300 begins at block 302 when the hypervisor 140 receives an asserted interrupt in a virtual machine (VM) 115. Interrupt assertion generally describes the process of initiating an interrupt in a computer system. For example, an interrupt may be asserted when a hardware interrupt or a software interrupt is generated. Further, an asserted interrupt may be associated with an interrupt register such as, for example, an Interrupt Request Register (IRR), an In-Service Register (ISR), an Interrupt Mask Register (IMR), etc.

At block 304, the hypervisor 140 injects the asserted interrupt into the virtual machine (VM) 115. In an example, the hypervisor 140 sets an interrupt vector bit corresponding to the asserted interrupt either before and/or after the asserted interrupt is injected into the virtual machine (VM) 115. The hypervisor 140 may set the bit, for example, to indicate that an asserted interrupt is pending or is being serviced. The hypervisor 140 also may update an interrupt counter 160 to track the asserted in the virtual machine (VM) 115.

At block 306, an interrupt location corresponding to the asserted interrupt is stored in an area of memory in the hypervisor 140. For example, the hypervisor 140 may store an interrupt vector location corresponding to the asserted interrupt received in block 302 in interrupt location 162.

In an example, the hypervisor 140 uses the interrupt location 162 to store a location of a set interrupt vector corresponding to an asserted interrupt in a virtual machine (VM) 115. In one example, the hypervisor 140 may use the interrupt location 162 to store a position of an interrupt vector bit that has been set in response to an asserted interrupt. For example, the hypervisor 140 may store the position or an offset of a set interrupt vector bit among a series of interrupt vector bits. The hypervisor 140 then may examine the interrupt location 162 at a later time to determine whether an interrupt vector is set, and if so, the identity of an asserted interrupt based on the corresponding set interrupt vector.

In another example, the hypervisor 140 may determine that a single interrupt vector is set in the virtual machine (VM) 115 when performing interrupt related operations. For example, the hypervisor 140 may find a single interrupt vector is set when clearing another interrupt and/or based on performing a scan of registers for any reason. The hypervisor 140 then may determine whether the interrupt location 162 already contains location information for the set interrupt vector. The hypervisor 140 then may store the location of the set interrupt vector in the interrupt location 162 when determining that it is not already stored there. Thus, the hypervisor 140 may update the interrupt location 162 at any time to reflect the status of interrupt vectors in a virtual machine (VM) 115. Similarly, the hypervisor 140 also may examine the interrupt location 162 at any time to determine a number of interrupt vectors that are set in a virtual machine and/or the location of a single interrupt vector that is set in a virtual machine.

In an example, the hypervisor 140 may update the interrupt location 162 to a special invalid value when it determines that at least one other interrupt vector is already set. For example, the hypervisor 140 may examine interrupt location 162 and determine that an interrupt vector is set when a valid interrupt location is present. In one example, the hypervisor 140 may set the interrupt location 162 to a special invalid value to flag or indicate that use of the interrupt location 162 optimization is not available at a particular time because one or more other interrupt vectors are set and/or that a register scan may be necessary to determine the status of asserted interrupts in a virtual machine (VM) 115.

Figure 4:
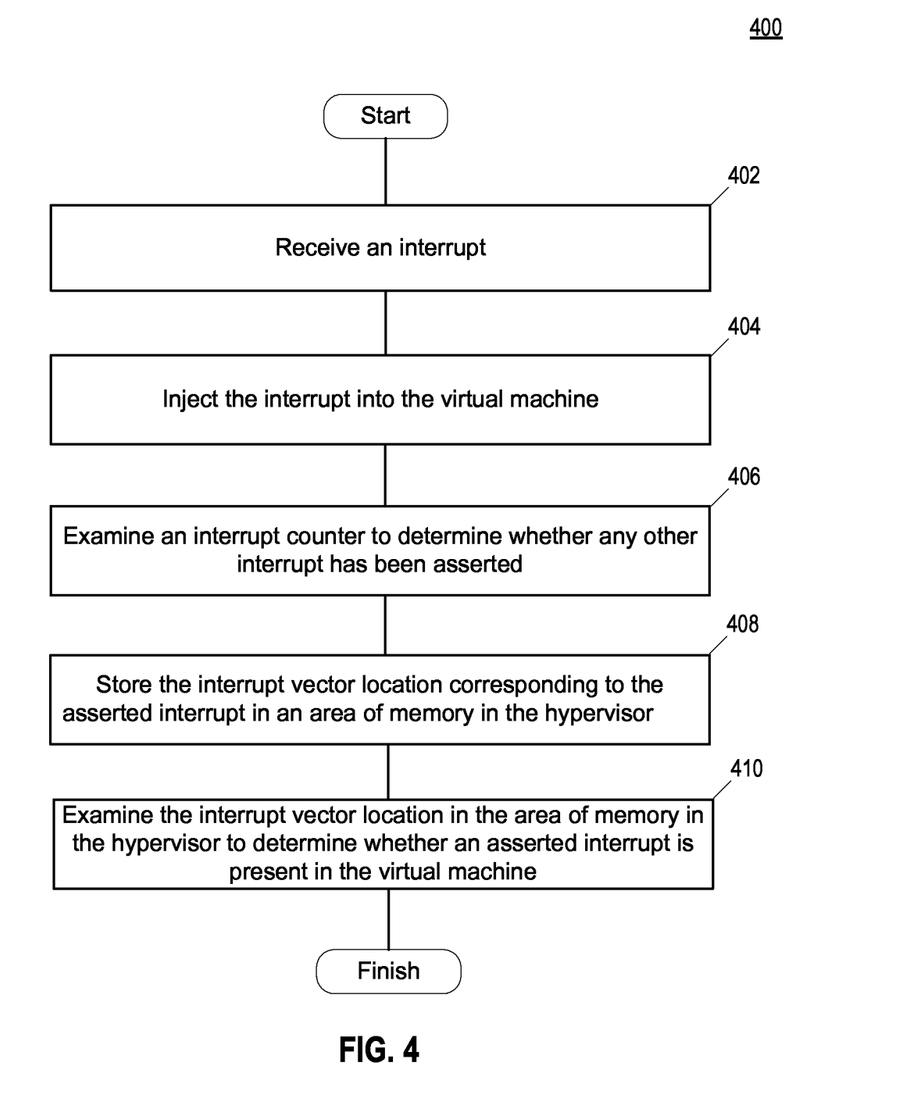
FIG. 4 is a flow diagram illustrating an example of a method for using a stored interrupt location and an interrupt counter to provide fast interrupt register access in a hypervisor.

FIG. 4 is a flow diagram illustrating an example of a method for using a stored interrupt location and an interrupt counter to provide fast interrupt register access in a hypervisor. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by the hypervisor 140 of FIG. 1.

Method 400 begins at block 402 when the hypervisor 140 receives an asserted interrupt in a virtual machine (VM) 115. In one example, a first physical CPU is used to assert the interrupt that is received by the hypervisor 140.

At block 404, the hypervisor 140 injects the asserted interrupt into the virtual machine (VM) 115. In an example, the hypervisor 140 may inject the asserted interrupt received in block 402 when no corresponding interrupt vector is set in the virtual machine. In one example, the hypervisor 140 may determine that no interrupt is pending in the virtual machine (VM) 115 by first examining interrupt counter 160. In another example, the hypervisor 140 may inject the asserted interrupt based on determining that no higher priority interrupt is pending in the virtual machine (VM) 115. Further, the hypervisor 140 may perform block 404 using a second physical CPU that is different from the first physical CPU used to assert the interrupt in block 402.

At block 406, the hypervisor 140 examines the interrupt counter 160 to determine whether another interrupt is pending in the virtual machine (VM) 115. In one example, the hypervisor 140 examines the interrupt counter 160 prior to injecting the asserted interrupt in block 404. When the interrupt counter 160 is zero, the hypervisor 140 may, for example, determine that no interrupt vector is set in the virtual machine (corresponding to the asserted interrupt or otherwise). On the other hand, the hypervisor 140 may determine that another interrupt vector is set when the interrupt counter 160 is greater than or equal to one.

In one example, the hypervisor 140 uses a hardware-based interrupt counter 160 to determine whether any interrupt vectors are set. For example, the hypervisor 140 may examine a hardware implementation of an interrupt counter 160 to determine whether interrupt vectors are set. In some examples, the hypervisor 140 uses a hardware-based interrupt counter 160 and does not include or implement a software-based interrupt counter 160. Further, the hypervisor 140 may examine a hardware implementation of an interrupt counter 160 using a CPU instruction.

In an example, the hypervisor 140 may perform block 406 using a second physical CPU that is different from the first physical CPU used to assert the interrupt in block 402.

At block 408, an interrupt vector location corresponding to the asserted interrupt is stored in memory of the hypervisor 140 based on determining that an interrupt vector corresponding asserted interrupt is not set in the virtual machine (VM) 115. In an example, the hypervisor 140 stores the location of an interrupt vector corresponding to the asserted interrupt in the interrupt location 162. In an example, the hypervisor 140 may perform block 408 using a second physical CPU that is different from the first physical CPU used to assert the interrupt in block 402.

At block 410, the hypervisor 140 examines the interrupt vector location to determine whether an asserted interrupt is present in the virtual machine (VM) 115. In an example, the hypervisor 140 examines the interrupt location 162 to determine whether the location is unset or whether the location contains valid interrupt vector location information. When the interrupt location 162 is unset, the hypervisor may determine that no interrupt vector is set. When the interrupt location contains valid interrupt vector location information, then the hypervisor 140 may determine that a single, valid interrupt vector is set. Additionally, when the interrupt location is set to a special value, the hypervisor 140 may determine that multiple interrupt vectors have been set in the virtual machine (VM) 115. In an example, the hypervisor 140 may perform block 410 using a second physical CPU that is different from the first physical CPU used to assert the interrupt in block 402.

In one example, the hypervisor 140 may perform some or all of the blocks in method 400 as an atomic operation. Atomic operations generally prevent other processes and/or devices from reading from and/or writing to memory until an entire operation is complete. Atomic operations may be required, for example, when different processors are used to (1) assert an interrupt and (2) deliver the interrupt to a virtual machine.

In one example, the hypervisor 140 may perform the receiving of an asserted interrupt, the injecting of the asserted interrupt, and the storing of the register address in the interrupt location 162 as a single atomic operation. The hypervisor 140 also may perform any combination of the blocks in method 400 as an atomic operation. In addition, each block in method 400 may be performed individually as an atomic operation. Further, any blocks in method 400 may be combined with any other unspecified operation(s) in a single atomic operation.

Figure 5:
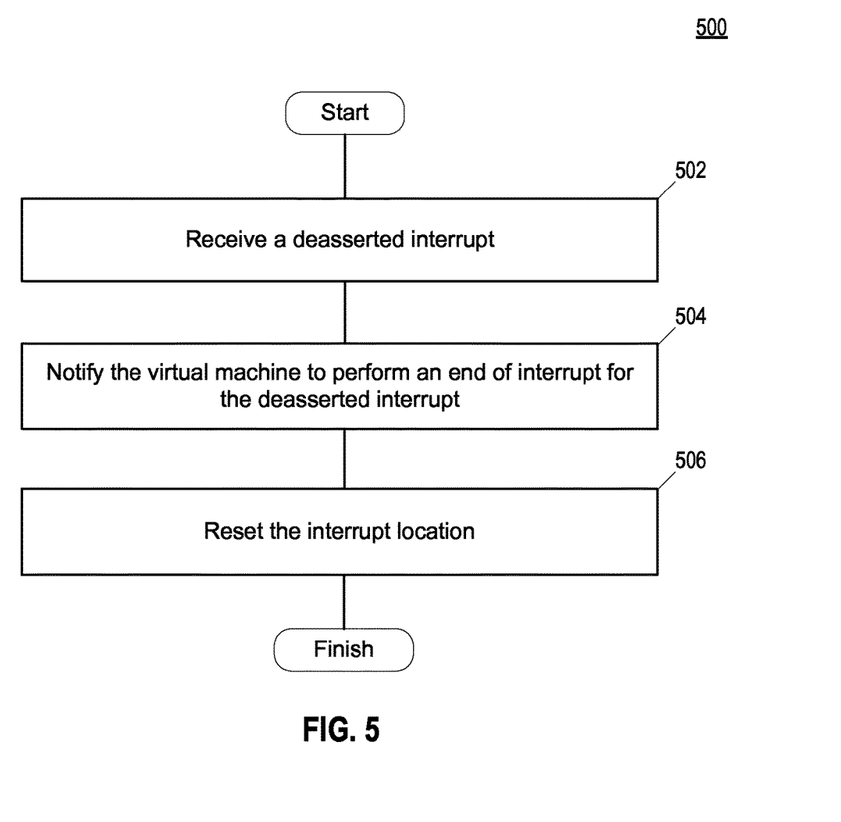
FIG. 5 is a flow diagram illustrating an example of clearing an interrupt location in response to receiving a deasserted interrupt.

FIG. 5 is a flow diagram illustrating an example of clearing an interrupt location in response to receiving a deasserted interrupt. The method 500 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 500 is performed by the hypervisor 140 of FIG. 1.

Method 500 begins at block 502 when the hypervisor 140 receives a deasserted interrupt in a virtual machine (VM) 115. Interrupt deassertion generally describes the process of signaling an end of a previously asserted interrupt. Interrupt deassertion may occur, for example, when interrupt handling is complete or a pending interrupt is no longer needed. In one example, a first physical CPU is used to deassert an interrupt.

At block 504, the hypervisor 140 notifies the virtual machine (VM) 115 to perform an "end of interrupt" for the deasserted interrupt received in block 502. In one example, the hypervisor 140 first may determine whether there is an asserted interrupt corresponding to the deasserted interrupt in the virtual machine (VM) 115.

For example, the hypervisor 140 may examine the interrupt counter 160 and/or the interrupt location 162 to determine when a corresponding asserted interrupt is present in the virtual machine (VM) 115. The hypervisor 140 then, in some examples, may send an "end of interrupt" to the virtual machine (VM) 115. For example, the hypervisor may notify the virtual machine (VM) 115 to perform an "end of interrupt" based on determining that an interrupt vector corresponding to a related asserted interrupt is set. Further, the hypervisor 140 also may, for example, decrement an interrupt counter 160 associated with the virtual machine (VM) 115 as part of the deassertion.

In some examples, the hypervisor 140 may not notify the virtual machine (VM) 115 to perform an "end of interrupt" when a deasserted interrupt is received. For example, when the hypervisor 140 may not notify the virtual machine 115 (VM) to perform an "end of interrupt" when the hypervisor 140 determines that no corresponding interrupt vector set in the virtual machine (VM) 115. For example, the hypervisor 140 may determine that it is not necessary to notify the virtual machine (VM) 115 to perform an "end of interrupt" when there is no evidence of a corresponding asserted interrupt in the virtual machine. In an example, the hypervisor 140 may perform block 504 using a second physical CPU that is different from the first physical CPU used to assert the interrupt in block 502.

At block 506, the hypervisor 140 resets the area of memory used to maintain an interrupt location of an asserted interrupt. In an example, the hypervisor 140 resets, reinitializes and/or clears the interrupt location 162 to a "special", "invalid", or "reserved" value that is not associated with any valid interrupt vector in the virtual machine (VM) 115. In one example, the new or updated value of the interrupt 162 location is a value used by the hypervisor 140 to indicate that the interrupt location 162 is clear and is available for use. In an example, the hypervisor 140 may perform block 504 using a second physical CPU that is different from the first physical CPU used to assert the interrupt in block 506.

In one example, the hypervisor 140 may perform some or all of the blocks in method 500 as an atomic operation. The hypervisor 140 may perform the blocks as atomic operations to prevent other processes and/or devices from reading from and/or writing to memory until an entire operation is complete. Atomic operations may be required, for example, when different processors are used to (1) deassert an interrupt and (2) deliver a corresponding notification to a virtual machine.

In one example, the hypervisor 140 may perform the receiving of a deasserted interrupt, the notifying of the virtual machine (VM) 115, and the resetting of the location (i.e., the interrupt location 162) as a single atomic operation. The hypervisor 140 also may perform any combination of the blocks in method 500 as an atomic operation. In addition, any block in method 500, such as the resetting of the interrupt location 162, may be performed individually as an atomic operation. Further, any of the blocks in method 500 may be combined with any number of other operations as part of a single atomic operation.

Figure 6:
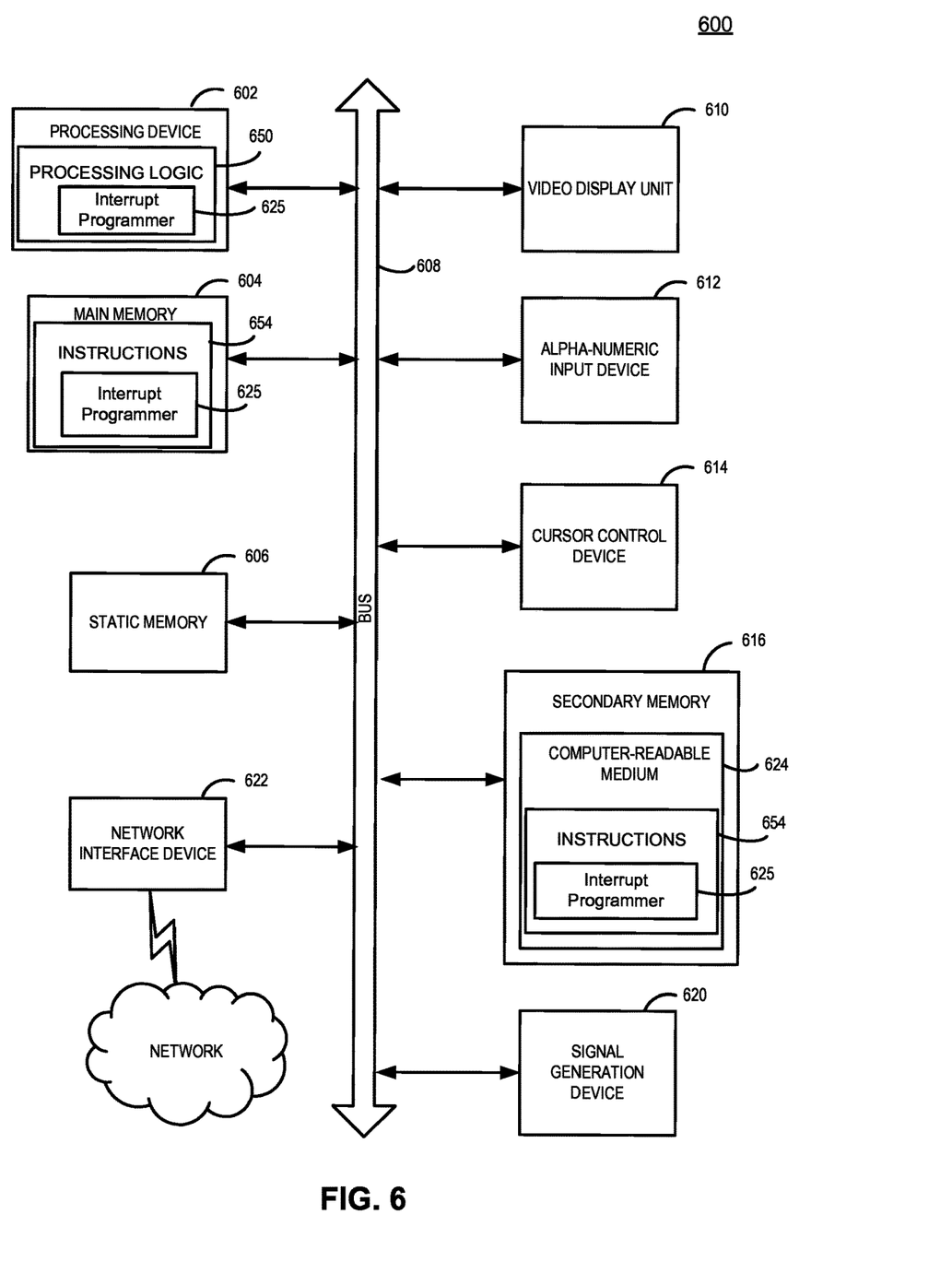
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. The processing device may include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., interrupt programmer 625). The instructions 654 may also reside, completely or at least partially, within the main memory 604 and/or within the processing device 602 during execution thereof by the computer system 600 (where the main memory 604 and the processing device 602 constituting machine-readable storage media).

While the computer-readable storage medium 624 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 600 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

maintaining, by a virtual machine monitor (VMM) executed by a processing device, an area of memory allocated to the VMM to track a location of an interrupt vector of an asserted interrupt for a virtual machine of a plurality of virtual machines, wherein the VMM manages the plurality of virtual machines;

receiving, by the VMM, the asserted interrupt for the virtual machine of the plurality of virtual machines;

setting, by the VMM, an interrupt vector bit for the asserted interrupt in an emulated register of a plurality of emulated registers associated with the virtual machine responsive to an indication that there is not another interrupt that is pending for the virtual machine;

examining, by the VMM, the area of memory allocated to the VMM to determine whether a number of other interrupt vector bits set for the virtual machine exceeds a threshold number; and responsive to determining that the number of other interrupt vector bits set for the virtual machine does not exceed the threshold number, storing, by the VMM, in the area of memory allocated to the VMM, interrupt location information identifying the interrupt vector bit set for the asserted interrupt in the emulated register of the plurality of emulated registers associated with the virtual machine, wherein the stored interrupt location information causes the VMM to subsequently locate the interrupt vector of the asserted interrupt without scanning the plurality of emulated registers associated with the virtual machine of the plurality of virtual machines.

2. The method of claim 1, further comprising obtaining the indication that there is not another interrupt that is pending for the virtual machine comprises:

examining, by the VMM, a counter that is stored in another area of memory that is assigned to the VMM without scanning the plurality of emulated registers associated with the virtual machine, wherein the counter represents a number of asserted interrupts for the virtual machine, wherein the number being zero indicates that there is no interrupt that is pending for the virtual machine.

3. The method of claim 2, further comprising:

updating, by the VMM, the counter to track the asserted interrupt that is injected into the virtual machine, wherein the updating of the counter causes the VMM to subsequently determine whether the interrupt vector is set in the virtual machine without scanning the plurality of emulated registers associated with the virtual machine.

4. The method of claim 1, wherein the storing is performed in view of determining that no interrupt vector is pending for the virtual machine.

5. The method of claim 1, further comprising:

detecting, by the VMM, that the interrupt location information that is stored in the area of memory is set to a value that does not correspond to a valid interrupt vector.

6. The method of claim 1, further comprising:

notifying, by the VMM, the virtual machine that interrupt processing for the asserted interrupt has completed.

7. The method of claim 1, wherein the area of memory is initialized to a value other than a valid interrupt vector location.

8. The method of claim 1, wherein the virtual machine provides a software-based emulation of an advanced programmable interrupt controller (APIC) architecture in a simulated x86 environment.

9. A non-transitory computer-readable medium comprising instructions that, responsive to execution by a processing device of a host machine, cause the processing device to:

maintaining, by a virtual machine monitor (VMM) executed by the processing device, an area of memory allocated to the VMM to track a location of an interrupt vector of an asserted interrupt for a virtual machine of a plurality of virtual machines, wherein the VMM manages the plurality of virtual machines;

receive, by the VMM, the asserted interrupt for the virtual machine of the plurality of virtual machines;

set, by the VMM, an interrupt vector bit for the asserted interrupt in an emulated register of a plurality of emulated registers associated with the virtual machine responsive to an indication that there is not another interrupt that is pending for the virtual machine;

examine, by the VMM, the area of memory allocated to the VMM to determine whether a number of other interrupt vector bits set for the virtual machine exceeds a threshold number; and responsive to determining that the number of other interrupt vector bits set for the virtual machine does not exceed the threshold number, store, by the VMM, in the area of memory allocated to the VMM, interrupt location information identifying the interrupt vector bit set for the asserted interrupt in the emulated register of the plurality of emulated registers associated with the virtual machine, wherein the stored interrupt location information causes the VMM to subsequently locate the interrupt vector of the asserted interrupt without scanning the plurality of registers associated with the virtual machine of the plurality of virtual machines.

10. The non-transitory computer-readable medium of claim 9, processing device is further to:

examine, by the VMM, a counter to determine a number of asserted interrupts associated with the virtual machine, wherein the number being zero indicates that there is no interrupt that is pending in the virtual machine.

11. The non-transitory computer-readable medium of claim 10, wherein the processing device is further to:

update, by the VMM, the counter to track the asserted interrupt that is injected into the virtual machine, wherein the update of the counter causes the VMM to subsequently determine whether the interrupt vector is set in the virtual machine without having the processing device scan the plurality of emulated registers associated with the virtual machine.

12. The non-transitory computer-readable medium of claim 9, wherein the processing device is further to:

receive, by the VMM, a deasserted interrupt; and notify, by the VMM, the virtual machine to perform an end of interrupt for the asserted interrupt.

13. The non-transitory computer-readable medium of claim 9, wherein the processing device is further to:

detect, by the VMM, that the interrupt location information stored in the area of memory is set to a value that does not correspond to a valid interrupt vector.

14. A system, comprising:

a memory; and a processing device of a host machine, the processing device coupled to the memory, the processing device to:

maintain, by a virtual machine monitor (VMM) executed by the processing device, an area of memory allocated to the VMM to track a location of an interrupt vector of an asserted interrupt for a virtual machine of a plurality of virtual machines, wherein the VMM manages the plurality of virtual machines;

receive, by the VMM, the asserted interrupt being for the virtual machine of the plurality of virtual machines;

set, by the VMM, an interrupt vector bit for the asserted interrupt in an emulated register of a plurality of emulated registers associated with the virtual machine responsive to an indication that there is not another interrupt that is pending for the virtual machine;

examine, by the VMM, the area of memory allocated to the VMM to determine whether a number of other interrupt vector bits set for the virtual machine exceeds a threshold number; and responsive to determining that the number of other interrupt vector bits set for the virtual machine does not exceed the threshold number, store, by the VMM, in the area of memory allocated to the VMM, interrupt location information identifying the interrupt vector bit set for the asserted interrupt in the emulated register of the plurality of emulated registers associated with the virtual machine, wherein the stored interrupt location information causes the VMM to subsequently locate the interrupt vector of the asserted interrupt without scanning the plurality of emulated registers associated with the virtual machine of the plurality of virtual machines.

15. The system of claim 14, the processing device further to:

examine a counter to determine a number of asserted interrupts associated with the virtual machine, wherein the number being zero indicates that there is no interrupt that is pending for the virtual machine.

16. The system of claim 15, wherein processing device is further to:

update the counter to track the asserted interrupt that is injected into the virtual machine, wherein the update of the counter causes the VMM to subsequently determine whether the interrupt vector is set for the virtual machine without having the processing device scan the plurality of emulated registers associated with the virtual machine.

17. The system of claim 14, wherein the processing device is further to:

detect that the interrupt location information stored in the area of memory is set to a value that does not correspond to a valid interrupt vector.

* * * * *